United States Patent [19]
Hannabery

[11] Patent Number: 5,367,601
[45] Date of Patent: Nov. 22, 1994

[54] SUPPLEMENTAL HEAT CONTROL SYSTEM WITH DUCT TEMPERATURE SENSOR AND VARIABLE SETPOINT

[75] Inventor: Robert T. Hannabery, Center Valley, Pa.

[73] Assignee: World Technology Group, Inc., Baltimore, Md.

[21] Appl. No.: 197,296

[22] Filed: Feb. 16, 1994

[51] Int. Cl.⁵ ............................ F25B 29/00; F24H 1/00
[52] U.S. Cl. .................................. 392/307; 165/29; 236/91 F
[58] Field of Search ................... 392/307; 165/29; 236/91 F; 237/213

[56] References Cited

U.S. PATENT DOCUMENTS

| | | | |
|---|---|---|---|
| 4,265,298 | 5/1981 | Sumner, Jr. et al. | 165/29 |
| 4,332,352 | 6/1982 | Jaeger | 165/29 |
| 4,353,409 | 10/1982 | Saunders et al. | 165/29 |
| 4,387,763 | 6/1983 | Benton | 165/29 |
| 4,702,305 | 10/1987 | Beckey et al. | 165/29 |
| 4,716,957 | 1/1988 | Thompson et al. | 165/29 |

*Primary Examiner*—Bruce A. Reynolds
*Assistant Examiner*—John A. Jeffery
*Attorney, Agent, or Firm*—Eckert Seamans Cherin & Mellott

[57] ABSTRACT

A heating system has a primary heat source such as a heat pump, with a capacity that occasionally needs to be supplemented from a supplemental heat source such as an electrical resistance heater. The heating system heats and circulates a medium such as air via supply and return ducts. A thermostat responsive to the heated space has two outputs for operation at different user-selected temperatures defining stages of operation at which the primary and secondary heat sources are normally drawn upon. The invention controls the duct temperature by activating the supplemental heat source according to a further setpoint, that is adjusted by a processor or other control circuit. A temperature sensor allows the control circuit to determine the duct temperature. The control circuit is also coupled to the two thermostat outputs and to a memory register storing the variable duct temperature setpoint. The duct temperature is compared to the duct temperature setpoint and the supplemental heating means is enabled to increase the duct temperature when the duct temperature falls below the variable setpoint. The control circuit adjusts the duct temperature setpoint upwardly upon occurrence of the temperature in the heated space dropping below a lower one of the space temperature setpoints (indicating that the heat pump is not keeping up), and downwardly upon the temperature in the heated space exceeding a higher one of the two space temperature setpoints (indicating that the heating capacity is adequate and use of the resistance heater should be reduced).

18 Claims, 4 Drawing Sheets

SUPPLEMENTAL HEAT CONTROL SYSTEM WITH DUCT TEMPERATURE SENSOR AND VARIABLE SETPOINT

BACKGROUND OF THE INVENTION

1. Field of the Invention

The invention relates to the field of control devices for activating and deactivating space heating means and the like to maintain a desired temperature. In particular, the invention concerns a controller coupled to activate a supplemental heater in a heating system having a heat pump as the primary source of heat, and a two stage room thermostat with switched outputs representing two room temperature setpoints. The heat pump is controlled to seek the higher room temperature setpoint. The controller senses and responds to the temperature of duct air from the heater, and adjusts automatically the duct temperature setpoint at which the supplemental heater is activated.

2. Prior Art

Heat pump systems use a refrigerant to carry thermal energy between a relatively hotter side of a circulation loop, where compression of the refrigerant by a compressor raises the temperature of the refrigerant, to a relatively cooler side of the loop at which the refrigerant is allowed to expand, causing a temperature drop. Thermal energy is added to the refrigerant on one side of the loop and extracted from the refrigerant on the other side, due to the temperature differences between the refrigerant and the indoor and outdoor air, respectively, to make use of the outdoor air as a thermal energy source. Heat Dump systems are also applicable to other heat sources and heat sinks such as ground source thermal sources/sinks, waste heat from industrial processes and the like, but are discussed herein with respect to air-to-air space heating, as an example.

The heat pump can be bidirectional. Suitable valve and control arrangements selectively direct the refrigerant through indoor and outdoor heat exchangers so that the indoor heat exchanger is on the hot side of the refrigerant circulation loop for heating and on the cool side for cooling. A circulation fan passes indoor air over the indoor heat exchanger and through ducts leading to the indoor space. Return ducts extract air from the indoor space and bring the air back to the indoor heat exchanger. A fan likewise passes ambient air over the outdoor heat exchanger, and releases heat into the open air, or extracts available heat therefrom.

Heat pump systems of this type are operative so long as there is an adequate temperature difference between the refrigerant and the air at the respective heat exchanger to maintain a transfer of thermal energy. For heating, the heat pump system is efficient provided the temperature difference between the air and the refrigerant is such that the available thermal energy is greater than the electrical energy needed to operate the compressor and the respective fans. The temperature difference generally is sufficient for efficient cooling, even on hot days. However, for heating when the outdoor air temperature is below about 25° F. (or −4° C.), the heat pump system may be unable to extract sufficient heat from the outdoor air to offset the loss of heat from the space due to convection, conduction and radiation of heat from the structure to the outdoors. A supplemental heating means is provided to supply the additional heat required to maintain the desired indoor air temperature. This is typically an electric resistance heater having elements disposed in the distribution duct downstream of the indoor heat exchanger of the heat pump, along the forced air path. It is also possible to use other forms of supplemental heaters, such a hydronic coils that carry heated water or the like.

Activation of the supplemental heater is typically controlled by an indoor (or room) thermostat, by which the occupants set a desired temperature to be maintained in the space by operation of the heating system. Conventional heat pump control systems use a two-stage-heat/one-stage-cool room thermostat. On a call for heat from the thermostat, the heat pump compressor and fans are activated to extract heat outdoors and to release the heat indoors. The heat pump operates until the indoor temperature reaches the thermostat setpoint and then is deactivated. If the heat loss of the structure is greater than the capacity of the heat pump, which occurs when outdoor temperatures drop, the indoor air temperature cannot be raised by the heat pump to the desired temperature. The indoor temperature continues to drop.

The room thermostat has a second switching means that is operated at a temperature slightly lower than the desired temperature at which the first switching means is operated. Conventionally, when the room temperature falls to the second setpoint defined by the thermostat, power is supplied to the supplemental heater. The supplemental heater supplies the additional heat needed to bring the indoor temperature up to the second setpoint temperature. This meets the objective of maintaining the room temperature, but requires power for the supplemental heater to replace the needed heat energy that could not be obtained from the outdoor air.

The conventional two stage heat control as described, causes wide swings in the temperature of the air emitted into the structure by the heat pump system. The duct air temperature may be as low as 80° F. (27° C.) when the heat pump is operating alone and the outdoor temperature is relatively low. Assuming the supplemental heater is arranged to heat the duct air, when the supplemental heater is operating together with the heat pump the temperature may rise to as high as about 125° F. (52° C.). This temperature swing occurs suddenly, upon activation of the supplemental heater. Other forms of supplemental heater also cause temperature swings associated with their output means.

A duct temperature of 80° F. is uncomfortably cool for the occupants, particularly when they are directly in the path of air emitted from a register. A duct temperature of 125° F. is inherently inefficient, because the duct air is so much warmer than the indoor air (typically controlled to a target temperature of 68° to 72° F., or 20°-22° C.) that temperature stratification occurs. The warm supplementally heated air rises to the ceiling, where the temperature can be as much as 8° to 10° F. warmer than near the floor. Not only is the warm air near the ceiling out of the area where it is needed for the comfort of the occupants, but in addition, stratification increases the temperature differential across the insulation in the ceiling and along the tops of the walls of the structure, leading to increased heat loss from the structure.

It would be desirable for improving the comfort of occupants and tier conserving energy, to provide a control system that provides a closer control on the operation of the supplemental heater, for example an electrical resistance heater. Advantageously, the control should maintain a comfortably warm duct temperature even as heat pump capacity and room temperature are sinking toward the level at which the supplemental heater is needed, but without wasting energy by unnecessary operation of the supplemental heater, and without causing bursts of hot air leading to stratification.

It would be possible to provide supplemental heating means with a proportional control, operable to activate the supplemental heater at a variable power level as a function of loading requirements. However, such a system is relatively more complex than an on/off controller, and makes more frequent use of the supplemental heater than would an on/off control. This is undesirable, because heat from the supplemental heater is more expensive than heat from the heat pump, and the full capacity of the heat pump should be utilized before the supplemental heat is activated at all.

When heat loading requirements change (for example if the sun begins to shine through the windows or use of a cooking stove adds indoor heat), a proportional control can react by reducing the power applied to the supplemental heater. However, the control is not adaptive in that it responds only to the room temperature. Moreover, a proportional control inherently applies the highest power level to the supplemental heater when the room temperature is at the lowest. In that case the proportionally controlled system has the same disadvantage as an on/off control with respect to heat burst operation. i.e., temperature stratification and increased heat loss when the heat pump is operating constantly but is failing to meet the load.

SUMMARY OF THE INVENTION

It is an object of the invention to control a supplemental heating system to maintain a comfortable room temperature and a comfortable temperature of the air emitted from the distribution duct(s), and to minimize the need for supplying air at a temperature substantially greater than the room air.

It is another object of the invention to ensure that the heating load of a building or the like is borne insofar as possible by the heat pump rather than by the supplemental heater, to conserve energy and expense.

It is also an object of the invention to provide an inexpensive and dependable control that operates substantially in an on/off manner, but reacts adaptively to changes in heat loading requirements.

These and other objects are accomplished according to the invention in a control system for a heater having a primary heating means such as a heat pump and a supplemental heating means such as electric resistance heaters. The control system activates and deactivates the supplemental heating means in part as a function of duct temperature, and has a stored duct temperature setpoint that is incrementally varied as a function of the occurrence of calls for first and second stage heat, and satisfaction of such calls following operation of the heat pump and the supplemental heater.

The variable duct temperature setpoint becomes a measure of the extent to which the heat pump system is operating efficiently. With variation of the duct temperature setpoint, the heating system delivers to the building the precise amount of heat needed under the circumstances. Wide supply air temperature swings are minimized as the heating system approaches the point at which the heat pump capacity becomes less than needed to support the heating load. The control system responds rapidly to changes in heat loading, which can vary with changes to internal factors related to building usage (e.g., cooking, operation of lights and appliances, etc.), and external weather factors (temperature, wind, time of day, sunshine and the like).

A heating system according to the invention has a primary heat source such as a heat pump, with a capacity that at times needs to be supplemented from the secondary heat source. The heating system preferably heats and circulates a medium such as air via supply and return ducts, but is also applicable to water circulation systems and other heating applications. A thermostat responsive to the heated space has two outputs for operation at different user-selected temperature setpoints defining stages of operation at which the primary and secondary heat sources are normally drawn upon. The invention controls the duct temperature by activating the supplemental heat source according to a further setpoint that is adjusted by a processor or other control circuit. A temperature sensor allows the control circuit to determine the duct temperature. The control circuit is also coupled to the two thermostat outputs and to a memory register storing the variable duct temperature setpoint. The duct temperature is compared to the duct temperature setpoint and the supplemental heating means is enabled to increase the duct temperature when the duct temperature falls below the variable setpoint. The control circuit adjusts the duct temperature setpoint upwardly upon occurrence of the temperature in the heated space dropping below the lower of the heated space temperature setpoints (indicating that the heat pump is not keeping up with the load), and downwardly upon the temperature in the heated space exceeding the higher of the two space temperature setpoints (indicating that the primary heating capacity is adequate and use of the supplemental heater should be reduced).

The temperature sensor is coupled to the processor or similar control circuit via an analog to digital converter. The analog to digital converter can be included on the processor chip, for example as in a PIC16C71 processor. Jumpers or the like are coupled to the processor for defining a default duct temperature setpoint, and the processor is operable after startup to adjust the duct temperature setpoint upwardly, and optionally downwardly, from the default duct temperature setpoint. In the event that the temperature in the heated space drops below the lower of the space temperature setpoints, the processor further compares the variable duct temperature setpoint to the default duct temperature setpoint. The duct temperature setpoint is reset to the value of the default duct temperature setpoint if the duct temperature setpoint is then less than the default duct temperature setpoint.

The control circuit increments or decrements the duct temperature setpoint upon completion of a heating cycle bringing the space temperature above a respective one of the space temperature setpoints. When in the cooling mode, the control circuit and the supplemental heating means are disabled.

Additional details and objects will be apparent from the following discussion of particular examples and embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
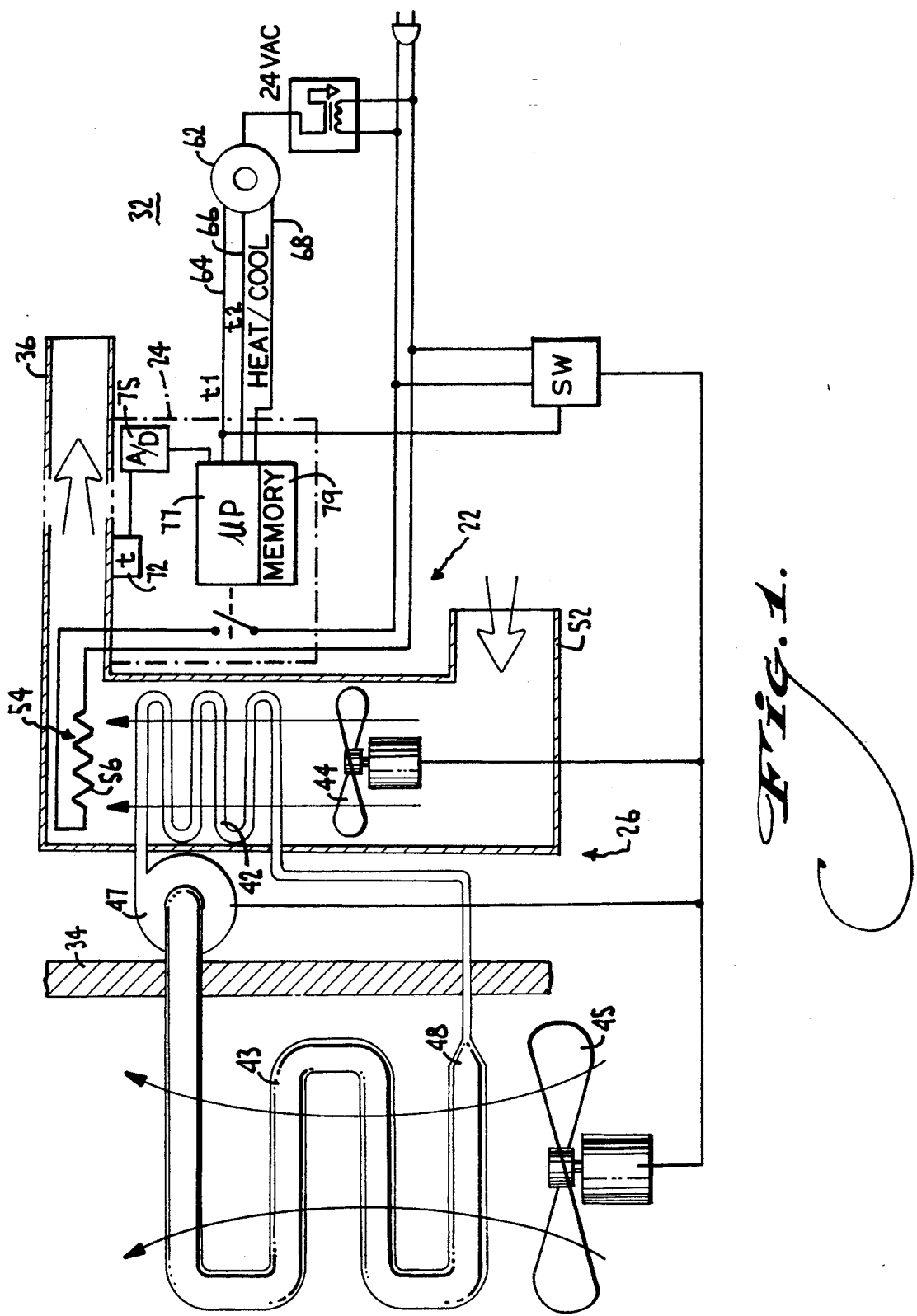
FIG. 1 is a block diagram showing the elements of a heating system with a supplemental heat control according to the invention.

A heating system 22 with a controller 24, according to the invention, is shown in FIG. 1 in block diagram form. The heating system 22 has a primary heating means 26 that functions as the basic source of heat for the indoor space 32 of a building 34 or similar heating load, and is operable when conditions are appropriate to heat and circulate a medium via ducts 36 for moving thermal energy from outdoors to indoors. The particulars of the indoor and outdoor heat exchangers 42, 43 and the specific media arranged to be hotter indoors and cooler outdoors are subject to variations. The system is described with reference to air/air heat exchangers for indoors and outdoors, with means 44, 45 for forcing air over the heat exchangers 42, 43, i.e., fans. It will be appreciated that the invention is also applicable to other forms of heat exchangers and other media to provide the source and sink for thermal energy.

The primary heating means as shown comprises a heat pump 26. A refrigerant circulation loop passes refrigerant such as Freon around a path including a compressor 47 that pressurizes the refrigerant and also drives the flow. An indoor heat exchanger 42 is associated with the compressor 47 for extracting heat energy from the refrigerant. An expander 48 and an outdoor heat exchanger 43 associated with the expander 48 extract heat from the outdoor air. The refrigerant can be arranged to change phase around the loop in which case the compression and extraction of heat indoors changes the refrigerant from gas to liquid. At the expander 48 and outdoor heat exchanger 43, decompression and heating from the outdoor air cause the refrigerant to be vaporized. The heat pump 26 uses the compressor 47 to raise the refrigerant temperature at the indoor heat exchanger 42 to a higher temperature than the indoor air, and uses the expander 48 to lower the refrigerant temperature at the outdoor heat exchanger 43 to a lower temperature than the outdoor air. Accordingly, although the outdoor air typically is colder than the indoor air, thermal energy can by moved from outdoors to indoors.

Fans 44, 45 force air over the respective heat exchangers 42, 43. Indoors, a circulation fan 44 draws air from one or more return ducts 52 leading to the space 32 to be heated and passes the air over the indoor heat exchanger 42. The heated air passes along one or more distribution ducts 36 into the space 32 to be heated.

When the outdoor air is very cold, the refrigerant at the outdoor heat exchanger 43 may approach the temperature of the outdoor air, thereby reducing the extent of thermal transfer. When this occurs, the temperature of the refrigerant at the indoor heat exchanger 42 is likewise lower. A supplemental heating means 54 is provided for further heating the indoor air when necessary to supplement the heat pump 26 that forms the primary heating means for maintaining a desired temperature in the heated space 32. The supplemental heating means 54 can comprise, for example, an electric resistance heater having one or more nichrome heating elements 56 or the like. Switching means controlled according to the invention couple the heating elements 56 to the electric power line for release of heat.

The desired temperature is defined by operation of a thermostat 62 responsive to the heated space 32, typically a wall mounted room thermostat that is manually adjustable by the building occupants. The thermostat 62 has at least two outputs 64, 66 respectively indicating a heated space temperature falling below one of two temperature setpoints that are separated, for example, by one or several degrees. These setpoints define the temperatures at which first stage heating is required (triggering activation of the heat pump 26), and at which second stage heating is required (triggering activation of the supplemental heating means 54). Two-stage heat control thermostats are conventional with heat pump systems. Typically, the occupants set the desired temperature as the higher setpoint, by adjusting the mounting of switching means 68 such as a bimetallic element to which a mercury switch is attached (not shown) for providing a switched output. The lower setpoint is set a few degrees lower by providing a second mercury switch mounted to the same bimetallic element for operation at a slightly different angle of extension of the bimetallic element. Thus, adjusting the thermostat 62 moves both room temperature setpoints up or down together.

According to the invention, a temperature sensor 72 is coupled to determine the temperature of the air or other medium at the supply duct 36 carrying air from the indoor heat exchanger 42 and supplemental heating means 54, to the indoor heated space 32. The duct temperature is variable with operation of the primary and supplemental heating means 26, 54. The invention uses a variable setpoint duct temperature control in addition to the two signals 64, 66 from the room thermostat 62, for controlling operation of the supplemental heating means 54.

A control circuit 24, coupled to the duct temperature sensor 72 and to the thermostat signals 64, 66, activates and deactivates the supplemental heating means 54. The control circuit 24 has inputs coupled to the temperature sensor 72, preferably via an analog to digital converter 75 that can provide a numerical output. The temperature sensor 72 can comprise a thermistor disposed on or in the duct 36, having a resistance that varies with temperature, coupled to a current source to develop a voltage signal representing duct temperature. This signal is amplified and coupled to an the analog to digital converter 75 for providing duct temperature information to the control circuit 24, which preferably comprises a microprocessor 77.

The control circuit 24 is also coupled to the thermostat 62, and thus receives information regarding the onset of calls for first and second stage heating. By cessation of the calls, the control circuit 24 can determine that the first and/or second stage calls have been met (i.e., when the temperature rises again to the respective setpoint).

A memory means 79 is included in or coupled to the control circuit 24, for storing a variable duct temperature setpoint. The processor or other control circuit 24 adjusts the setpoint stored in this memory means 79 based on the succession of calls for first and second stage heat, and whether or not such calls have been met. Accordingly, the control circuit 24 compares the duct temperature to the duct temperature setpoint, and activates an output to enable the supplemental heating means 54 when the duct temperature falls below the duct temperature setpoint.

The control circuit 24 incrementally adjusts the duct temperature setpoint stored in the memory means 79, upwardly upon occurrence of the temperature in the heated space 32 dropping below the lower of the two space temperature setpoints, and down wardly upon the temperature in the heated space 32 exceeding the higher of the two space temperature setpoints.

Preferably, the processor or control circuit 24 has a default duct temperature setpoint to which the processor sets the duct temperature for control of the supplemental heating means 54 after startup. The default duct temperature can be stored in the programming of the processor, for example in the firmware or ROM that stores the processor's executable coding. The processor also can be coupled to an input means such as a set of jumper wires or jumper plugs 81 whereby the default temperature can be set when initially setting up the control circuit 24. In any event, the default temperature is loaded into some form of storage register 79 and the processor 77 is operable thereafter to adjust the duct temperature setpoint from the default duct temperature setpoint by adding to or subtracting from the stored duct temperature setpoint.

Figure 2:
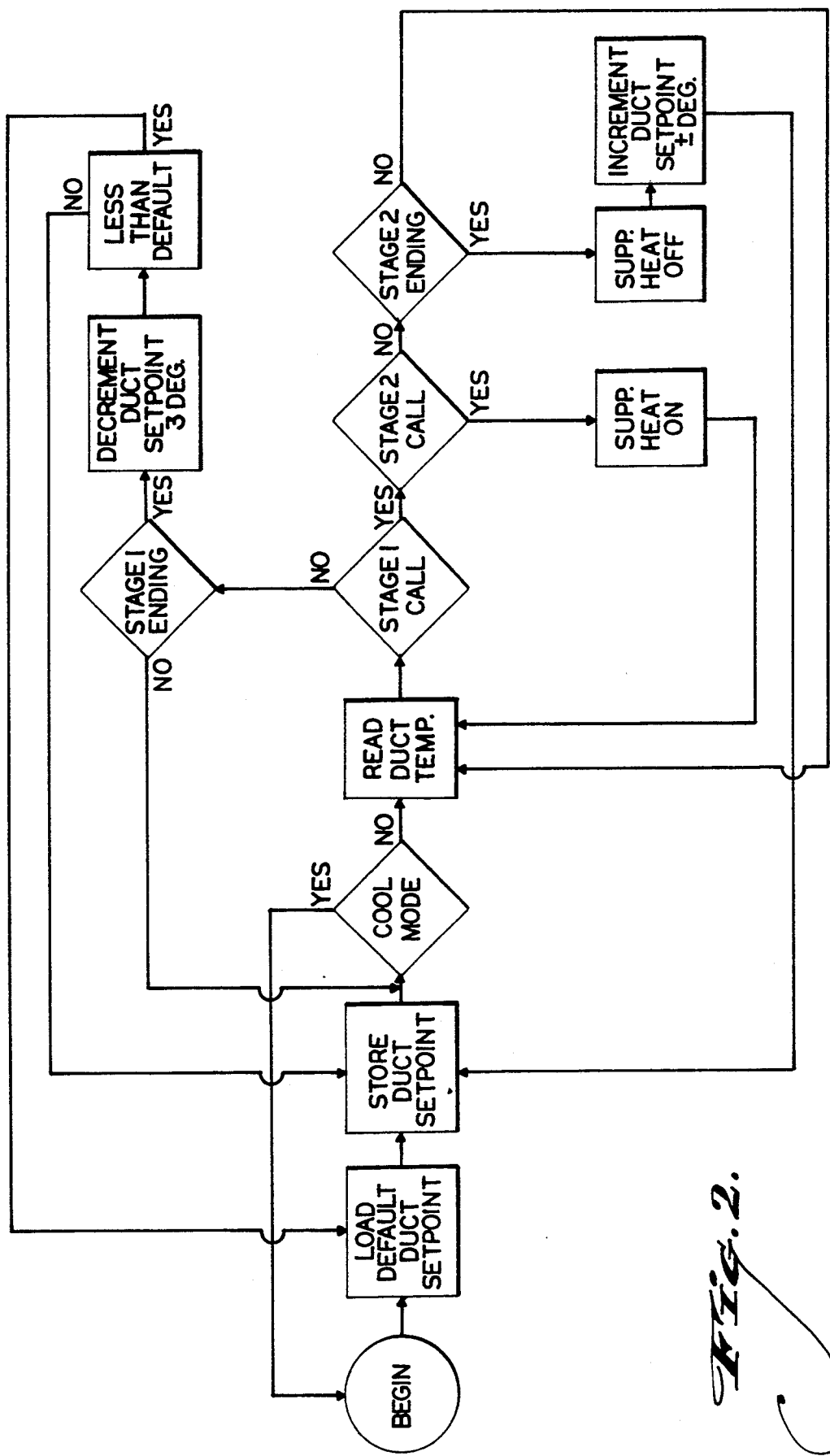
FIG. 2 is a flow chart illustrating incremental adjustment of the duct temperature setpoint according to the invention.

Operation of the control circuit 24 is shown by the flow chart of FIG. 2. The operation can be accomplished by programmed steps of a processor 77 or by the operation of switching logic circuits. Advantageously, the processor is a digital microprocessor that incorporates or is coupled to an analog to digital converter for obtaining a numerical representation of the duct temperature from the duct temperature sensor. Preferably, upon initial startup the duct temperature is established at the default or base temperature selected by the installer via at least one jumper pin 81 on the printed circuit board of the controller circuit 24, selected from a number of alternative choices in a range of choices, for example representing temperatures between 80° and 110° F. An advantageous default duct temperature is typically about 90° F. or 32° C.

On a first stage call for heat from the room thermostat 62 (e.g., upon closure of the switching means for the higher temperature setpoint), the heat pump 26 is activated, being switched either directly from the thermostat contacts, or from an output of the control circuit 24. The control circuit 24 then monitors the duct temperature, preferably beginning after a short delay during which the duct temperature reaches an equilibrium. If the duct temperature as sensed is less than the duct temperature setpoint (initially the default duct temperature), the control circuit 24 activates an output for switching on the supplemental resistance heater 54. The control circuit 24 operates the resistance heater 54 as needed to keep the duct air temperature at the duct temperature setpoint. Such operation can be proportional or on/off, but preferably is a simple on/off control output, activated (or deactivated) at least on a pulsed basis on a periodic cycle of the control circuit. For proportional operation, the power to the resistance heaters 54 can be pulse width modulated or controlled by varying the voltage applied.

In the event that the second stage switching means of the room thermostat 62 calls for heat (i.e., at the lower temperature room temperature setpoint), the control circuit 24 activates the supplemental resistance heaters continuously or at full power until the second stage call has been satisfied as shown by the room thermostat lower temperature switching means switching off. The occurrence of a second stage call, however, is an indication to the control circuit 24 that the present heat requirements of the building were not being met at the duct temperature setpoint that was then being maintained.

Upon satisfaction of the second stage call for heat, the control circuit 24 incrementally increases the duct temperature setpoint and stores the new setpoint in its memory means 79. This may occur repeatedly, with the duct temperature setpoint being incrementally adjusted upwardly whenever a second stage call occurs and is satisfied. The control circuit 24 will always activate the supplemental resistance heaters in response to the call for heat from the second stage switching means of the room thermostat 62, regardless of the state of any other input.

Whereas the duct temperature at which the heating system is operated is thus raised, the heating system will presumably provide sufficient heat to keep the building at the required temperature. This is accomplished by controlling for the appropriate duct temperature within a range of duct temperatures, for example, of 80° to 125° F. However, according to the invention the duct temperature is kept at the necessary temperature rather than swinging widely between the temperature that the heat pump 26 can achieve on its own and the much higher temperature to which the duct temperature is raised during a second stage call for heat from the thermostat 62.

Of course, the heat loading requirements of the structure change over time, for various reasons such as changes in the outdoor temperature, changes in the operation of heat dissipating indoor appliances, etc. If during operation of the heating system the first stage temperature setpoint of the room thermostat 62 is reached, the signal from the switching means for the higher temperature room thermostat setpoint indicates to the control circuit 24 that the duct temperature setpoint is too high for the present heating needs of the structure. It is desirable that the heating needs of the structure be met as much as possible by the heat pump 26 and not by the supplemental heater 54, whose heat is more expensive than that of the heat pump 26 because the supplemental heat results from power dissipation rather than transfer of available thermal energy from outdoors to indoors. Accordingly, if the first stage becomes satisfied, the control circuit 26 decrements the duct temperature setpoint. This places more of the load, and potentially all of the load, on the heat pump 26. Preferably, the duct temperature setpoint is decremented by a greater amount upon meeting the first stage call than the duct setpoint was incremented upon previous satisfaction(s) of a second stage call. For example, after incremental increase(s) of one degree F per occurrence, the duct setpoint is decremented by three degrees upon satisfying a first stage call.

When operating at a heating load level that can be satisfied by the heat pump 26 operating alone, successive first stage calls are met over and over, resulting in a duct temperature setpoint below the selected default duct temperature. This is appropriate because it is desirable that the heating load be borne by the heat pump 26 insofar as possible. However, it is also desirable for the controller to respond promptly to a change in heating load requirements when necessary. If a second stage call is received from the room temperature thermostat 62, the control circuit 24 compares the present duct temperature setpoint to the default value. If the duct temperature setpoint is below the default value, the control circuit 24 preferably resets the stored duct temperature setpoint to be equal to the default value, rather than simply incrementing the duct temperature setpoint back upwardly, which would take longer to reach the value at which the heating load is properly handled without extreme duct temperature swings. If the duct temperature setpoint is equal to or greater than the default value upon occurrence of a second stage call, the controller 24 operates as described above to increment the duct temperature setpoint when a second stage call is satisfied, for example by one degree, and to decrement the duct temperature setpoint when a first stage call is satisfied, for example by three degrees. The span by which the duct temperature is decremented defines the temperature hysteresis in the worst case.

The foregoing operation in which the duct temperature setpoint is increased and decreased by degrees is merely exemplary. It is possible to provide a heating system and controller according to the invention having any resolution, for example controlling in steps of fractional degrees or two or more degrees, as desired. It is also possible to allow the user (or the installer) to select between modes of operation in which the duct temperature setpoint is permitted to decrement below the default temperature, or is always kept at least equal to the default temperature. In FIG. 2, the control circuit 26 monitors whether a HARD BASE MODE has been selected, the HARD BASE MODE being the mode in which the duct temperature setpoint is always kept at least equal to the default temperature. This selection between modes (i.e., between the HARD BASE MODE being enabled or disabled) can be made by a switch or another jumper.

Maximum efficiency and minimum operating costs are achieved if the duct temperature setpoint is allowed to go below the default value, but this will allow the duct temperature to go below the default value as well, affecting comfort (i.e., sometimes blowing relatively cool air when the heat pump is not operating near full capacity). Setting a hard and fast minimum duct temperature setpoint (e.g., equal to the default value) ensures that the duct air will remain at or above the minimum, but may use supplemental heat that is unnecessary to maintain the room temperature at the desired temperature, while keeping the duct temperature from dropping below the minimum.

Figure 3:
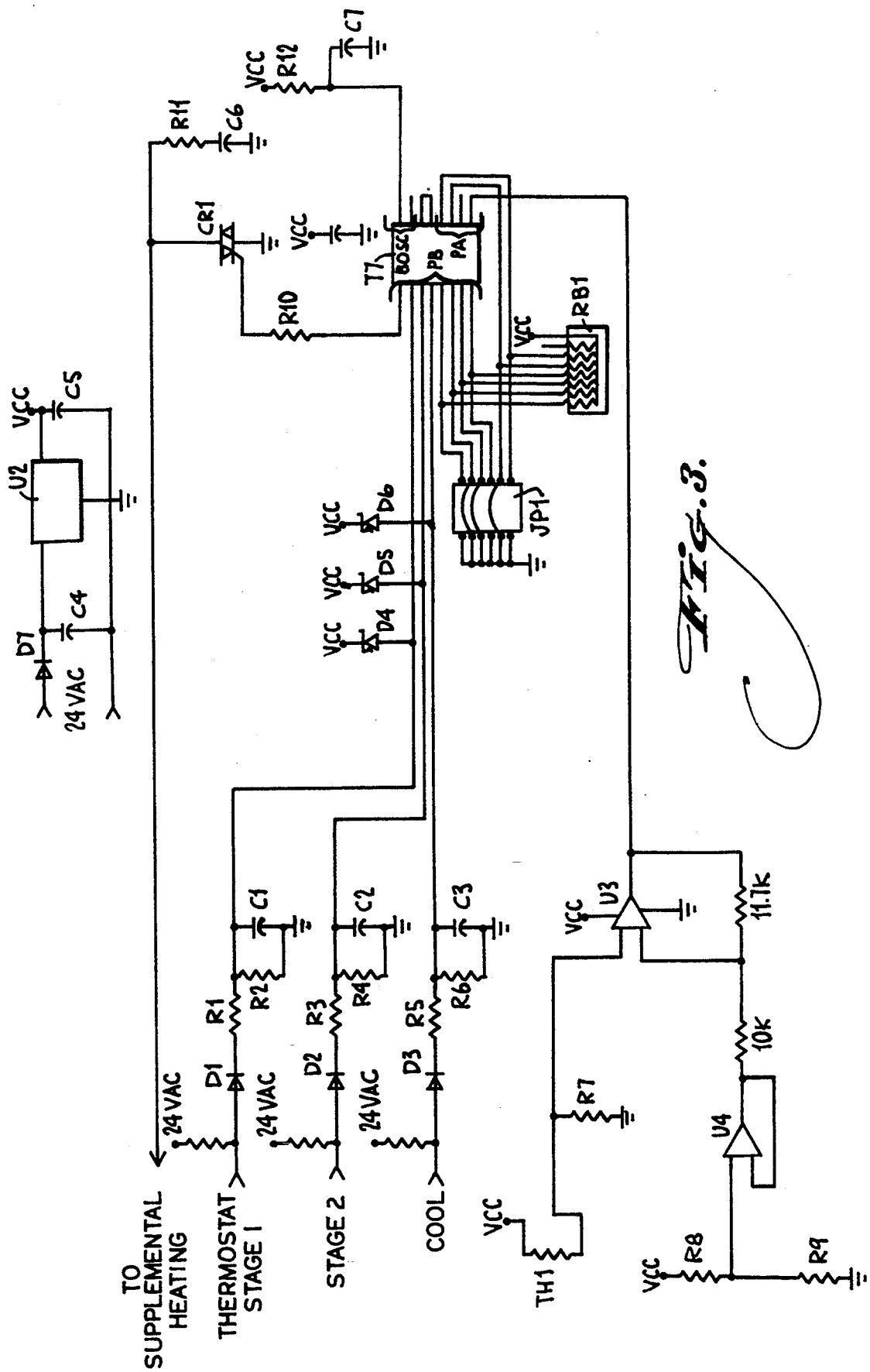
FIG. 3 is a schematic circuit diagram showing a controller according to a first embodiment of the invention.
Figure 4:
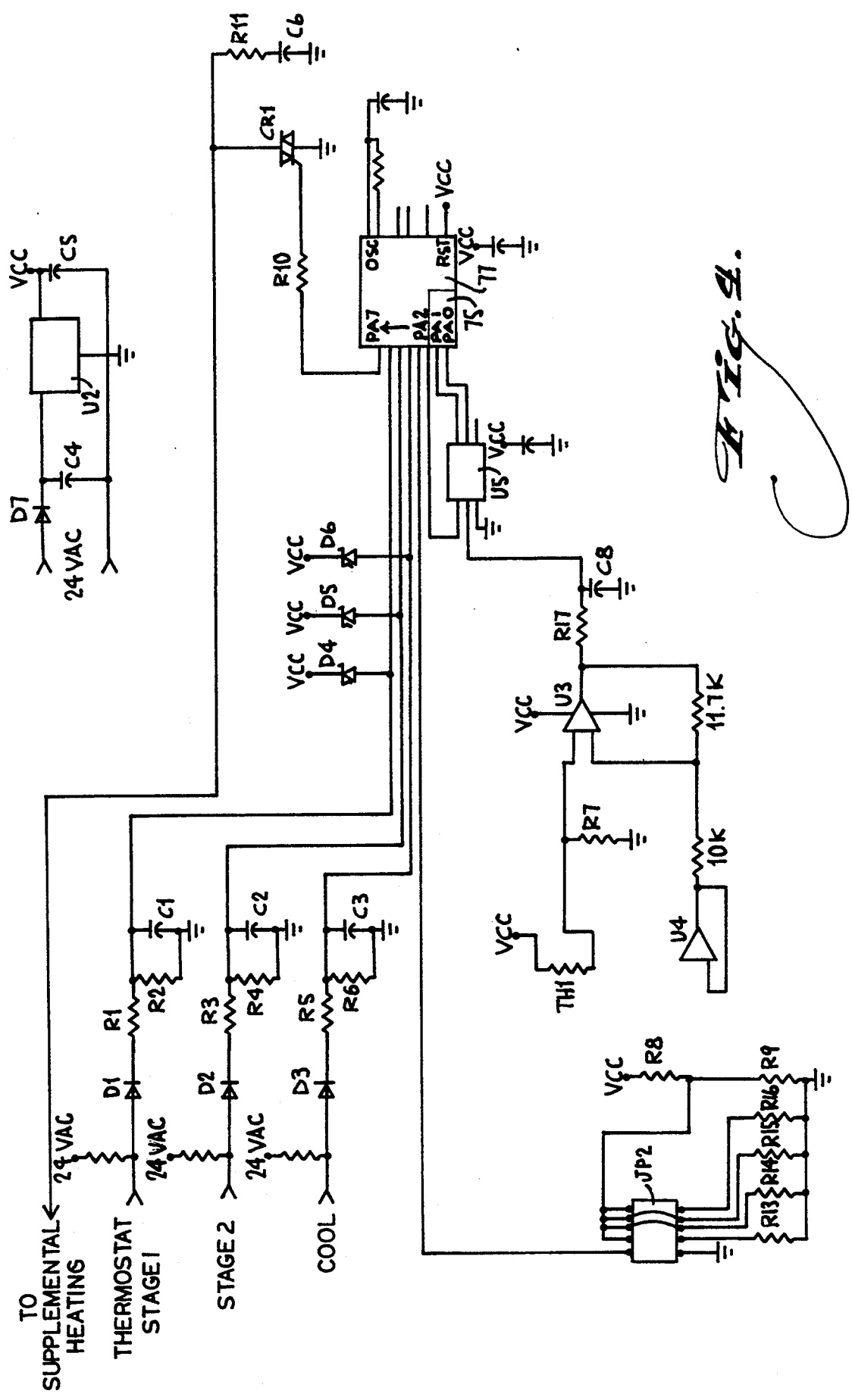
FIG. 4 is a schematic circuit diagram showing a controller according to a second embodiment.

The controller 24 of the invention can be implemented using a simple and inexpensive control circuit. Two exemplary embodiments are shown in FIGS. 3 and 4. In FIGS. 3 and 4, the controller is implemented using a microprocessor 77 having an on-board analog to digital converter, such as model PIC16C71. Referring to FIGURE 3, the default duct temperature is set by jumpers 81 coupled to a jumper block JP1 having the pins on one side grounded and on the other side coupled to inputs of digital processor 77. The processor 77 internally includes a firmware memory for storage of program coding, and changeable registers or random access memory for storage of data.

The circuit is powered from a 24 VAC source (not shown), and the switched input signals from the room thermostat 62 are rectified by diodes D1-D3, divided down by voltage divider resistor pairs R1/R2 through R5/R6, and respectively filtered by capacitors C1-C3 to provide zero to five volt digital signals, clamped to +5V by zener diodes D4-D6. A regulated 5V DC supply is provided via rectifier D7, filter capacitors C4 and C5, and voltage regulator U2, coupled to the 24 VAC source.

A thermistor TH1 is arranged to measure the temperature of duct air supplied to the building. The thermistor TH1 can be disposed in the duct 36, downstream of the primary and supplemental heating means 26, 54 along the air flow path. Alternatively, the thermistor TH1 can be attached to an outer surface of a thermally conductive duct 36 (e.g., of sheet metal) for sensing the internal temperature, thereby providing an inherent operational delay. The thermistor TH1 is coupled between supply voltage $V_{cc}$ and resistor R7, thus forming a voltage divider producing a voltage that varies with the temperature dependent change in the resistance of the thermistor TH1. The voltage divider voltage is coupled to an input of an operational amplifier U3. The other input of the amplifier U3 is coupled via voltage follower amplifier U4 to a second voltage divider of fixed resistances R8/R9, providing a reference. The amplifier U3 amplifies the difference between the voltage at the thermistor voltage divider vs. the voltage at the reference voltage divider, the latter serving as an offset voltage. The gain of the amplifier is determined by the value of the feedback resistor coupling the output of the amplifier to its inverting input. The output of amplifier U3 is coupled to the sense input of the analog to digital converter in processor 77.

The installer bridges across the grounded side of jumper block JP1 and the inputs of processor 77 at selected pins for setting the default temperature, and also preferably for setting options such as whether or not the duct temperature setpoint will be allowed to fall below the default value, whether the COOL input signal (to disable the controller) is high-true or low-true, etc. Jumper wires, bridging plugs, a DIP switch or the like can be used for selectively affixing conductors between the input and output jumper block pins to ground one or more inputs to processor 77. The inputs are otherwise pulled high by pull-up resistor block RB1, defining the setpoint default duct temperature that is initially loaded into the processor 77, and may be reloaded in the event a second stage call occurs when the present duct temperature setpoint is lower than the default. In the embodiment shown, four bits are provided for the default temperature, permitting sixteen alternative choices, and two bits are used for the other selections. Assuming the default temperature can be set between 80° and 110° F., the binary combinations of jumpers define default temperatures in increments of 2°.

The processor 77 operates as discussed above, adjusting the stored duct setpoint temperature and operating the supplemental heating means 54 when needed to maintain the duct temperature as sensed by thermistor TH1 to the stored duct temperature setpoint. The processor 77 produces a digital output, coupled by resistor R10 to the trigger input of a triac CR1. The triac CR1 is coupled in series with the supplemental heating resistors 54 or other heating means, and the 24 VAC supply, and thus switches power to the supplemental heating means 54 when the processor output is true. Resistor R11 and capacitor C6, and also resistor R12 and capacitor C7, decouple noise at the 24 VAC supply and at the $V_{cc}$ input to the microprocessor 77, respectively.

A "COOL" mode signal is also coupled to the processor 77 via a 24 VAC signal from the thermostat 62, typically produced by a manual on/off switch thereon. In the event the system is in the COOL mode, the processor 77 disables operation of the supplemental heating means 54. As noted above, one of the jumper inputs determines whether the COOL mode is to be indicated by the presence or absence of a 24 VAC signal from the thermostat or other control device.

In the embodiment of FIG. 4, the thermostat inputs, processor output and power supply arrangements are similar to those of FIG. 3, and the same reference numbers are used to identify corresponding elements. However, in this embodiment, the default temperature is determined at jumper block JP2, in an analog manner. One or more resistors selected from R13–R16 are coupled by selected jumpers across JP2, in parallel with reference voltage divider resistor R9. This sets the reference voltage or offset at the input of the amplifier U3 that amplifies the difference in voltage between the thermistor voltage divider and the reference voltage. The output of amplifier U3 is integrated or averaged by resistor R17 and capacitor C8, and then coupled to the input of a sample-and-hold U5. U5 is loaded by a clock signal from the processor 77, which as in the embodiment of FIG. 3 includes an on-board analog to digital converter.

A number of variations are possible. For example, a greater resolution can be provided by using more bits. Different arrangements for the analog to digital conversion can be used (e.g., digitizing the voltage at the thermistor voltage divider via an analog to digital converter apart from the processor IC, etc.). Instead of providing a reference voltage divider, the processor can be arranged to scale and/or offset the temperature data numerically. Display means or alarms can be provided, etc. Such variations should be readily apparent in view of the invention as disclosed.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive fights are claimed.

I claim:

1. In a heater system having a primary heating means operable to heat and circulate a medium via a duct, and a supplemental heating means for further heating the medium when necessary to supplement the primary heating means for maintaining a desired temperature in a heated space, the primary and supplemental heating means being activatable in part by a thermostat responsive to the heated space, having at least two outputs respectively indicating a heated space temperature falling below one of two space temperature setpoints, of which one is the desired temperature of the heated space, a controller comprising:
   a temperature sensor coupleable to determine a temperature of the medium at the duct;
   a control circuit having inputs coupled to the temperature sensor and to said outputs of the thermostat, the control circuit being coupled to determine the duct temperature from the temperature sensor;
   memory means coupled to the control circuit, the control circuit being operable to store in the memory means a variable duct temperature setpoint, to compare the duct temperature to the duct temperature setpoint, and to activate an output to enable the supplemental heating means when the duct temperature falls below the duct temperature setpoint;
   wherein the control circuit includes means for incrementally adjusting the duct temperature setpoint stored in the memory means, upwardly upon occurrence of the temperature in the heated space dropping below a lower one of the space temperature setpoints, and downwardly upon the temperature in the heated space exceeding a higher one of the two space temperature setpoints.

2. The controller according to claim 1, wherein the primary heating means comprises a heat pump and wherein the desired temperature is manually adjustable and the lower one of the two setpoints is a predetermined temperature lower than the desired temperature.

3. The controller according to claim 1, wherein the temperature sensor is coupled to the control circuit via an analog to digital converter, and wherein the control circuit comprises a numerical processor.

4. The controller according to claim 3, further comprising means coupled to the processor for defining a default duct temperature setpoint, and wherein the processor is operable after startup to adjust the duct temperature setpoint from the default duct temperature setpoint.

5. The controller according to claim 4, wherein the processor is operable in the event of the temperature in the heated space dropping below a lower one of the space temperature setpoints to compare the duct temperature setpoint to the default duct temperature setpoint and to reset the duct temperature setpoint to the value of the default duct temperature setpoint if the duct temperature setpoint is less than tile default duct temperature setpoint.

6. The controller according to claim 1, wherein the control circuit increments or decrements the duct temperature setpoint upon completion of a heating cycle bringing the space temperature above a respective one of the space temperature setpoints.

7. The controller according to claim 1, further comprising means for switching between a heating mode and a cooling mode, and wherein the control circuit is disabled in the cooling mode from activating the supplemental heating means to maintain the duct temperature at the duct temperature setpoint.

8. The controller according to claim 1, wherein the supplemental heating means is electrically powered, and the control circuit comprises a switched output for coupling power to the supplemental heating means.

9. A heating system, comprising:
   a primary heating means operable to heat and circulate a medium via a duct;
   a supplemental heating means for further heating the medium when necessary to supplement the primary heating means for maintaining a desired temperature in a heated space;
   a thermostat responsive to the heated space, having at least two outputs respectively indicating a heated space temperature falling below one of two space temperature setpoints, of which one is the desired temperature of the heated space;

a temperature sensor coupled to determine a temperature of the medium at the duct;

a control circuit having inputs coupled to the temperature sensor and to said outputs of the thermostat, the control circuit being coupled to determine the duct temperature from the temperature sensor;

memory means coupled to the control circuit, the control circuit being operable to store in the memory means a variable duct temperature setpoint, to compare the duct temperature to the duct temperature setpoint, and to activate an output to enable the supplemental heating means when the duct temperature falls below the duct temperature setpoint;

wherein the control circuit is operable incrementally to adjust the duct temperature setpoint stored in the memory means, upwardly upon occurrence of the temperature in the heated space dropping below a lower one of the space temperature setpoints, and downwardly upon the temperature in the heated space exceeding a higher one of the two space temperature setpoints.

10. The heating system according to claim 9, wherein the primary heating means comprises a heat pump and wherein the desired temperature is manually adjustable and the lower one of the two setpoints is a predetermined temperature lower than the desired temperature.

11. The heating system according to claim 10, wherein the supplemental heating means is electrically powered, and wherein the control circuit includes a switched output for coupling power to the supplemental heating means.

12. The heating system according to claim 11, wherein the supplemental heating means includes an electrical resistance heater.

13. The heating system according to claim 10, wherein the supplemental heating means includes a hydroponic heater.

14. The heating system according to claim 9, wherein the temperature sensor is coupled to the control circuit via an analog to digital converter, and wherein the control circuit comprises a numerical processor.

15. The heating system according to claim 14, further comprising means coupled to the processor for defining a default duct temperature setpoint, and wherein the processor is operable after startup to adjust the duct temperature setpoint from the default duct temperature setpoint.

16. The heating system according to claim 15, wherein the processor is operable in the event of the temperature in the heated space dropping below a lower one or the space temperature setpoints to compare the duct temperature setpoint to the default duct temperature setpoint and to reset the duct temperature setpoint to the value of the default duct temperature setpoint if the duct temperature setpoint is less than the default duct temperature setpoint.

17. The heating system according to claim 9, wherein the control circuit increments or decrements the duct temperature setpoint upon completion of a heating cycle bringing the space temperature above a respective one of the space temperature setpoints.

18. The heating system according to claim 9, further comprising means for switching between a heating mode and a cooling mode, and wherein the control circuit is disabled in the cooling mode from activating the supplemental heating means to maintain the duct temperature at the duct temperature setpoint.

* * * * *